US012643431B2

(12) United States Patent
Washington et al.

(10) Patent No.: US 12,643,431 B2
(45) Date of Patent: Jun. 2, 2026

(54) SYSTEM AND METHOD FOR CONTROLLING A VEHICLE BATTERY PACK BASED ON ESTIMATED OPEN CIRCUIT VOLTAGE

(71) Applicant: Ford Global Technologies, LLC, Dearborn, MI (US)

(72) Inventors: Donnell Matthew Washington, Northville, MI (US); Yonghua Li, Ann Arbor, MI (US); Michael David Beeney, Canton, MI (US); Gabrielle Vuylsteke, Ferndale, MI (US); Jennifer Miller, Royal Oak, MI (US); Andrea Cordoba Arenas, Ann Arbor, MI (US); Bowen Zhang, Farmington Hills, MI (US); Matthew Allen Tomai, Troy, MI (US); Laurie Ann Ramroth, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 131 days.

(21) Appl. No.: 18/613,446

(22) Filed: Mar. 22, 2024

(65) Prior Publication Data

US 2025/0296473 A1 Sep. 25, 2025

(51) Int. Cl.
*B60L 58/16* (2019.01)
*B60L 58/12* (2019.01)

(52) U.S. Cl.
CPC .............. *B60L 58/16* (2019.02); *B60L 58/12* (2019.02); *B60L 2240/545* (2013.01); *B60L 2240/547* (2013.01)

(58) Field of Classification Search
None
See application file for complete search history.

(56) References Cited

U.S. PATENT DOCUMENTS

| | | | |
|---|---|---|---|
| 8,855,956 B2 | 10/2014 | Thomas-Alyea | |
| 2009/0088994 A1* | 4/2009 | Machiyama | .......... H01M 10/48 702/63 |
| 2010/0289454 A1* | 11/2010 | Akabori | .................. B60L 58/12 320/132 |
| 2011/0316547 A1 | 12/2011 | Liu et al. | |
| 2013/0093430 A1* | 4/2013 | Hagimori | ........... G01R 31/3835 324/434 |

(Continued)

FOREIGN PATENT DOCUMENTS

| | | |
|---|---|---|
| CN | 103645372 B | 1/2016 |
| JP | 2014190723 A | 10/2014 |
| KR | 20170022855 A | 3/2017 |

*Primary Examiner* — James J Lee
*Assistant Examiner* — Jonathan E Reinert
(74) *Attorney, Agent, or Firm* — David B. Kelley; Brooks Kushman, P.C.

(57) ABSTRACT

A system for an electrified vehicle (EV) having a battery pack includes a vehicle controller configured to charge and discharge the battery pack according to power limits defined at activation of the EV by an estimated open circuit voltage (OCV). The estimated OCV is based on voltages measured for a duration after a last deactivation of the EV, at least one temperature measured after the last deactivation, and a decay parameter that is a function of the voltages measured and detected using a selected relaxation time and an iterative estimation of a sub-parameter of the decay parameter.

20 Claims, 4 Drawing Sheets

(56) References Cited

U.S. PATENT DOCUMENTS

| | | | |
|---|---|---|---|
| 2013/0322488 A1* | 12/2013 | Yazami | ............... H01M 10/486 |
| | | | 374/100 |
| 2018/0299511 A1* | 10/2018 | Kim | ..................... G01R 31/367 |
| 2019/0113581 A1* | 4/2019 | Kawamura | ............. B60L 58/12 |
| 2022/0212545 A1* | 7/2022 | Araujo Xavier | ........ B60L 50/60 |

* cited by examiner

SYSTEM AND METHOD FOR CONTROLLING A VEHICLE BATTERY PACK BASED ON ESTIMATED OPEN CIRCUIT VOLTAGE

TECHNICAL FIELD

The present disclosure generally relates to managing and/or controlling a battery pack for an electrified vehicle based, at least, on an open circuit voltage.

BACKGROUND

An electrified vehicle (EV) includes a battery pack, sometimes referred to as a traction battery, for providing power to electric motors to propel the EV. One or more operational characteristics of the battery pack, such as power limits and state of charge (SOC), may be estimated to control the charge and discharge operation of the battery pack.

In a non-limiting example, the EV includes a battery management module (BMM) and a control system. Generally, during a discharge operation (e.g., driving of the EV), the BMM is configured to estimate SOC, and the control system is configured to control various devices/subsystems within the EV by, for example, determining how much power can be drawn from the battery pack using the operational characteristics, inputs from a user, power demand of devices (e.g., motors, air condition system, etc.), and/or among other information. For a charge operation, the BMM is configured to provide a charge current/voltage request to the control system, which in return controls the EV to begin charging the battery pack (e.g., control an electric vehicle supply equipment (EVSE)).

SUMMARY

In one form, the present disclosure is directed to a system for an electrified vehicle (EV) having a battery pack. The system includes a vehicle controller configured to charge and discharge the battery pack according to power limits defined at activation of the EV by an open circuit voltage (OCV) that is based on voltages measured for a duration after a last deactivation of the EV, at least one temperature measured after the last deactivation, and a decay parameter that is a function of the voltages measured and detected using a selected relaxation time and an estimated sub-parameter of the decay parameter.

In one form, the present disclosure is directed to a method of controlling an electrified vehicle (EV) having a battery pack including a plurality of battery cells. The method includes responsive to a deactivation request, opening one or more contactors to electrically decouple the battery pack from a charge-discharge system of the EV. Responsive to an activation, the method further includes closing the one or more contactors to electrically couple the battery pack to the charge-discharge system, and charging or discharging the battery pack according to power limits defined at activation of the EV by an open circuit voltage (OCV) that is based on voltages measured for a duration after a last deactivation of the EV, at least one temperature measured after the last deactivation, and a decay parameter that is a function of the voltages measured and detected using a selected relaxation time and an estimated sub-parameter of the decay parameter.

DETAILED DESCRIPTION

Figure 1:
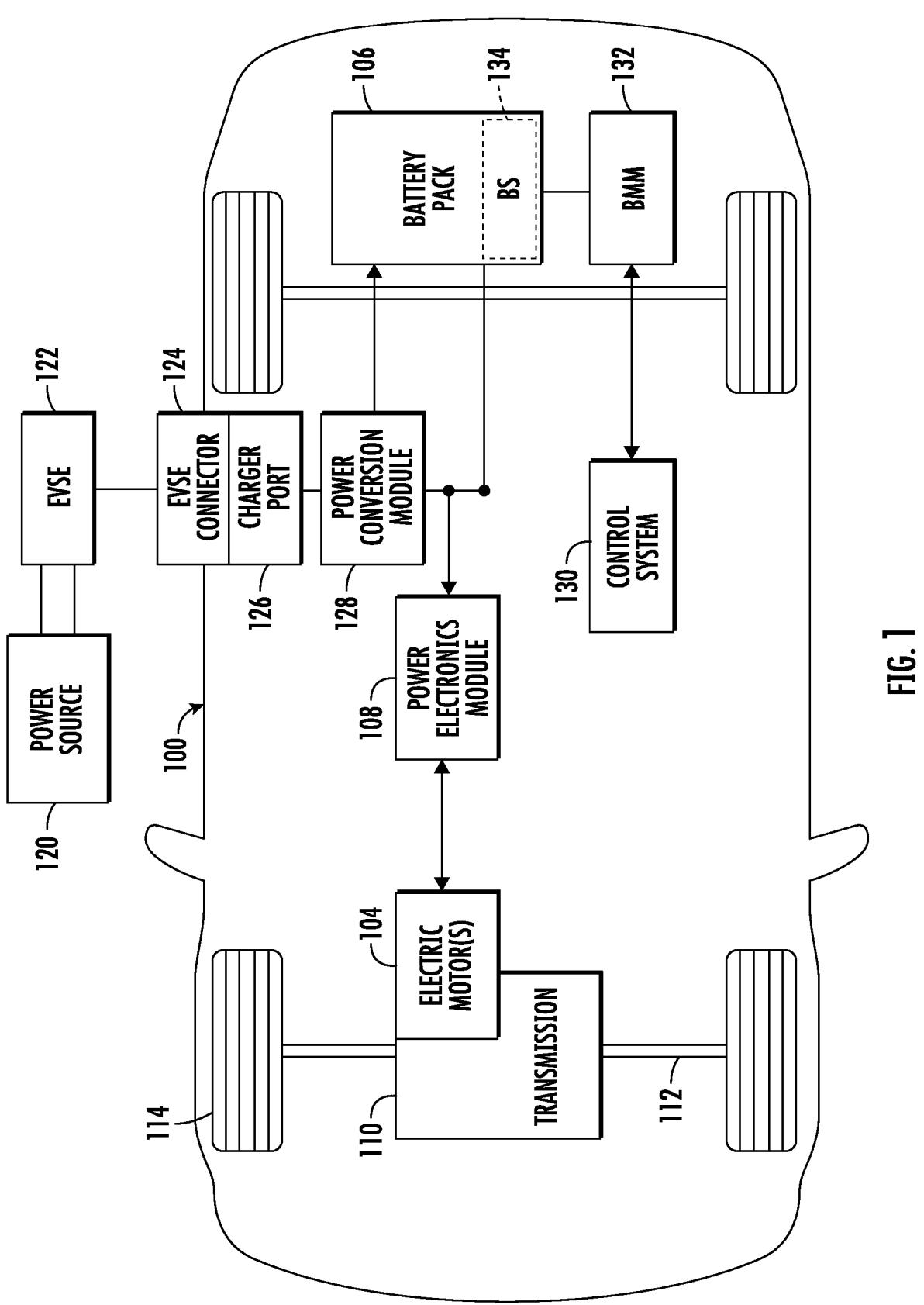
FIG. 1 is an example block diagram of an electrified vehicle (EV) in accordance with the present disclosure.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Generally, to manage a battery pack in an electrified vehicle (EV), a vehicle system of the EV needs to know a state of charge (SOC) of the battery pack to estimate the power capability/power limit of the battery pack. For most battery chemistries, the SOC is estimated based on an open circuit voltage (OCV) of the battery pack, which is the voltage of the battery pack at rest. In a non-limiting example, for hybrid electric vehicles (HEV), with the sizes of the battery cells typically on the order of five (5) ampere-hours, the OCV may stabilize within 30 minutes, but may take longer at colder temperatures. Specifically, stabilization is when the active material equally distributes (through diffusion) across the thickness of an electrode, and the time it takes to reach stabilization may be referred to as equilibrium time for the battery cell. Battery charge and discharge reactions occur at the electrode surface. As battery cells get bigger (e.g., increase in size), the electrodes tend to get thicker and thus, the equilibrium time increases. Some battery cells for EVs may require a few hours (e.g., over 3 hours) for the OCV to stabilize, which is longer at colder temperatures.

In various situations, it may be difficult for the EV to rest (i.e., no charging or discharging) for such long equilibrium times. For example, in one situation, a user of the EV may stop at a restaurant for a meal, which may only take one to two hours. In another example, the user may stop at a charging station, and the amount of time it takes between turning the EV off to charging the battery pack may be mere minutes.

Furthermore, the number of battery cells employed in the battery pack of the EV may also influence the detection of the OCV, which may be measured for each battery cell. Specifically, some EVs have about 100 cells in series, and with the EV moving towards higher electric power systems (e.g., 800V to 1200V), the number of battery cells may double or even triple, thereby increasing computational requirements of the vehicle system.

New EV battery warranty protocols may also require the EV to detect a state of certified energy (SOCE) or state of health (SOH), which is the amount of energy a battery pack can deliver for standard drive cycles relative to that when the battery pack was new. Accordingly, the SOC at rest derived from the OCV should be accurate to improve accuracy of capacity, where in terms of capacity estimates, 2% SOC error is relative to the SOC window the customer is operating in.

The present disclosure is generally directed to a vehicle system configured to charge/discharge a battery pack based on an estimated OCV. Specifically, the OCV is estimated for the battery pack using voltage measurements, a temperature measurement, and a decay parameter that is a function of the voltages since a last deactivation of the battery pack and detected using a selected relaxation time and an iterative estimation of a sub-parameter of the decay parameter. In a non-limiting example, the OCV is estimated for each battery cell, and then aggregated to determine the OCV for the battery pack. With the estimated OCV, the vehicle system can estimate a SOC, provide an available energy at the beginning of a drive cycle which is used to predict a vehicle drive range, and/or provide a power limit estimation, among other actions (e.g., output a SOH).

Figure 2:
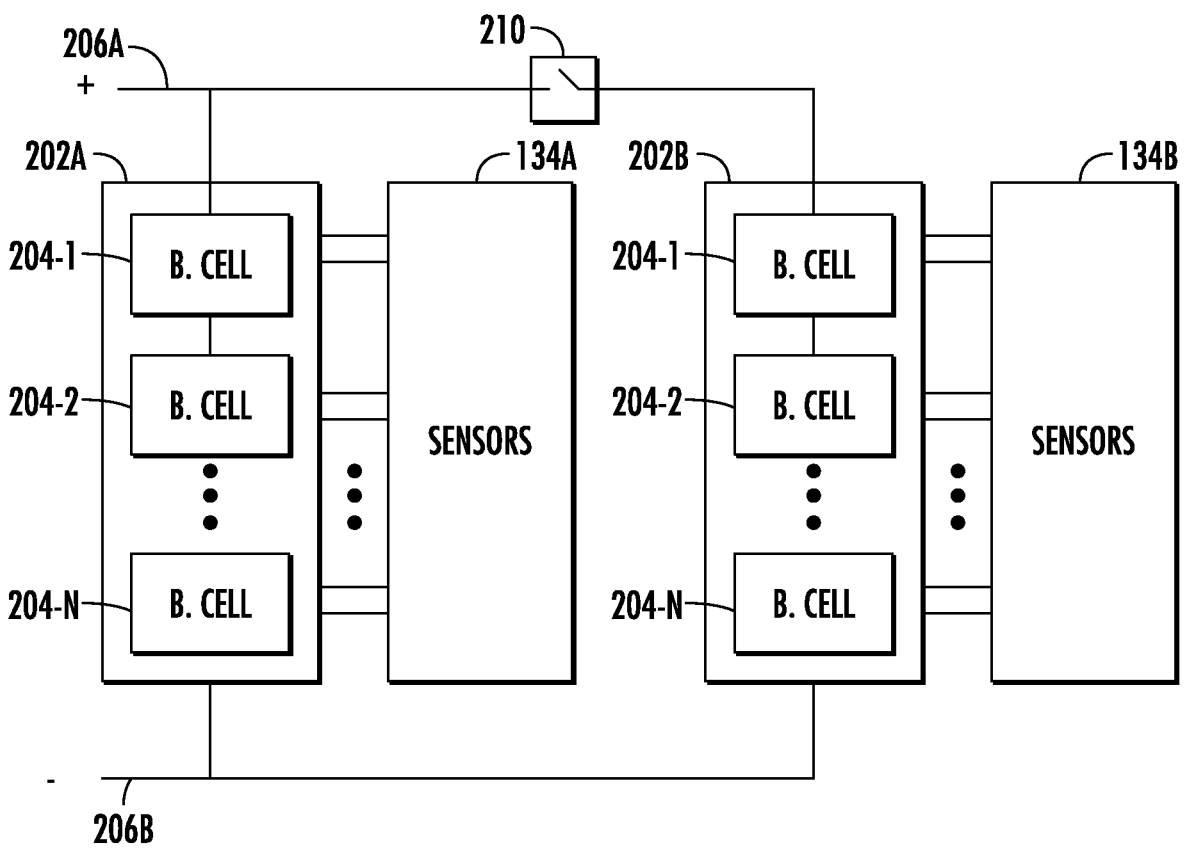
FIG. 2 is a block diagram of a battery pack of the EV in accordance with the present disclosure.

Referring to FIGS. 1 and 2, in one form, an EV 100 is provided as a full battery electric vehicle (BEV) powered by electric motors. In a non-limiting example, the EV 100 includes a powertrain system having one or more electric motors 104 (i.e., electric machines), a battery pack 106 (i.e., a traction battery), and a power electronics module 108. The EV 100 of the present disclosure does not include an engine, and thus, the battery pack 106 provides all of the propulsion power. In other variations, the present disclosure may be applied to other types of EVs such as a hybrid electric vehicle (plug-in or non-plug-in) having an engine, fuel cell electric vehicles (FCEV), and therefore, is not limited to pure battery powered EVs. In addition, the EV is not limited to four-wheel automobiles and may apply to scooters, three-wheel vehicles, aerial vehicles, and/or among other vehicles.

The electric motor 104 provides power movement of the EV 100, and in a non-limiting example, is mechanically connected to a transmission 110 that is mechanically connected to a drive shaft 112, which is mechanically connected to wheels 114 of the EV 100. In addition to providing propulsion power, the electric motor 104 may be configured to operate as a generator to recover energy that may normally be lost as heat in a friction braking system of EV 100.

The battery pack 106 provides a high-voltage (HV) direct current (DC) output that is employed to power the electric motor 104 via the power electronics module 108, and while one battery pack 106 is shown, the EV 100 may include multiple battery packs. In one form, the power electronics module 108, which includes an inverter, provides a bidirectional transfer energy between the battery pack 106 and the electric motor 104. Specifically, as known, the power electronics module 108 converts the DC voltage to a three-phase AC current to operate the electric motor 104, and in a regenerative mode, the power electronics module 108 converts three-phase AC current from the electric motor 104, which is acting as a generator, to DC voltage compatible with the battery pack 106.

The battery pack 106 may be rechargeable by an external power source 120 (e.g., the power grid/network), which is electrically connected to an electric vehicle supply equipment (EVSE) 122. The EVSE 122 provides circuitry and controls to manage the transfer of electrical energy between the external power source 120 and the EV 100. The external power source 120 may provide DC or AC electric power to the EVSE 122. The EVSE 122 may have a charge connector 124 for plugging into a charge port 126 of the EV 100.

The EV 100 may further include a power conversion module 128 that is an on-board charger having a DC/DC converter to condition power supplied from the EVSE 122 and provide the proper voltage and current levels to the battery pack 106. The power conversion module 128 may interface with the EVSE 122 to coordinate the delivery of power to the battery pack 106.

In one form, the EV 100 includes a control system 130 to coordinate the operation of the various components. The control system 130 includes electronics, software, or both, to perform the necessary control functions for operating the EV 100. The control system 130 may be a combination vehicle control system and powertrain control module (VSC/PCM). Although the control system 130 is shown as a single device, the control system 130 may include multiple controllers in the form of multiple hardware devices, or multiple software controllers with one or more hardware devices. In this regard, a reference to a "controller" herein may refer to one or more controllers.

In one form, the EV 100 includes a battery management module (BMM) 132 configured to estimate one or more operating characteristics of the battery pack 106 and provide one or more of the operating characteristics to the control system 130, which controls operation of the battery pack 106 (e.g., control charging/discharging of the battery pack 106). In a non-limiting example, during drive operation, the BMM 132 provides operational characteristics such as, but not limited to, power limit and/or SOC, to the control system 130, which determines how much power to draw from the battery pack 106. During a charge operation, the BMM 132 notifies the control system 130 of how much power is needed to charge the battery pack 106. The BMM 132 forms part of the vehicle control system with the control system 130, and while illustrated separate from the control system 130, may be integrated with the control system 130. In one form, the BMM 132 and the control system 130 may be referred to as a vehicle controller.

In one form, the BMM 132 is in communication with one or more sensors (also referred to as a battery sensor (BS)) 134 provided with the battery pack 106 to estimate characteristics of the battery pack 106, such as but not limited to, electric current, voltage, and/or temperature.

Among other components, the battery pack 106 includes multiple battery arrays 202A and 202B (collectively "arrays 202"), where each array 202 includes a plurality of battery cells 204-1 to 204-N (collectively "cells 204") connected in series (FIG. 2). The arrays 202 are connected to a positive power bus 206A and a negative power bus 206B (collectively "power buses 206"). While two arrays 202 are provided, the battery pack 106 may include one or more arrays 202, and should not be limited to the example provided herein. In addition, the arrays 202 and/or cells 204 of the battery pack 106 may be configured in various suitable ways. In a non-limiting example, the battery pack 106 may be configured to have the arrays 202 in series, and for each array 202, the cells 204 are provided in parallel.

The sensors 134 includes one or more sensors 134A and 134B for the arrays 202. In one form, the sensors 134 include voltage sensors and current sensors for measuring voltage and/or electric current of the array 202 and in some variations, of each battery cell 204. It should be readily understood that the sensors 134 may include other sensors, such as but not limited to, temperature sensors for measuring a temperature of the array 202 and/or the battery pack 106.

In one form, one or more contactors 210 are provided to inhibit or permit electric current from traveling through the power buses 206 to/from the battery pack 106. Specifically, the contactors 210 are operable to electrically decouple or couple the battery pack 106 from/to a charge-discharge system of the EV 100. The charge-discharge system of the EV includes components that either charge the battery pack 106 or act as a load to draw electric power from the battery pack 106, and thus, may include the charge port 126, the power electronics module 108, and/or the transmission 110, among other components. While one contactor 210 is illustrated, multiple contactors 210 may be used. In addition, the contactors 210 may be placed in various suitable position in the EV 100, such as, but not limited to, between the positive power bus 206A and the power electronics module 108. In a non-limiting example, the contactors 210 may be provided as a relay or electromechanical switch.

In one form, the BMM 132 is configured to open or close the contactors 210 based on a message/request from the control system 130. In a non-limiting example, the control system 130 is configured to detect when the EV 100 is to be turned on or off based on an activation input (e.g., a user pressing a button associated with activating/deactivating the EV 100). If the EV 100 is to be turned on, the control system 130 provides an activation request to the BMM 132 to close the contactors 210, thereby electrically coupling the battery pack 106 to the charge-discharge system of the EV 100. If the EV 100 is to be turned off, the control system 130 provides a deactivation request to the BMM 132 to open the contactors 210, thereby electrically decoupling the battery pack 106 from the charge-discharge system of the EV 100. In addition, the control system 130 is configured to have the BMM 132 close the contactor 210 by sending the activation request when the battery pack 106 is to be charged, which may be detected by a sensor at the charge port (e.g., a sensor indicating the EVSE 122 is connected to the charge port 126, a sensor for detecting a charge port door (not shown) opening, and/or among other suitable charge detection methods).

Figure 3:
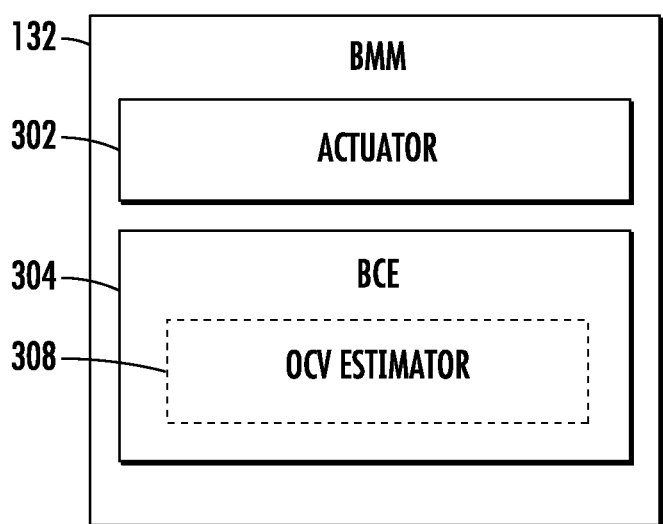
FIG. 3 is a block diagram of a battery management module of the EV in accordance with the present disclosure.

Referring to FIG. 3, in one form, the BMM 132 includes an actuator 302 for operating the contactors 210 in the closed/open positions and a battery characteristic estimator (BCE) 304. The BCE 304 is configured to estimate various operational characteristics of the battery pack 106, such as but not limited to, the OCV of each battery cell, the SOC of the battery pack 106, the power limit of the battery pack 106, and temperature(s) of the battery pack 106 or at other locations of the EV 100. As described in detail here, the BCE 304 includes an OCV estimator 308 to estimate the OCV of the battery pack 106 (estimate OCV of each battery cell 204).

In one form, the OCV estimator 308 is configured to estimate the OCV based on voltages measured by the sensors 134 after a last deactivation of the EV 100, a decay parameter that is a function of the voltages and a duration since the last deactivation, and a temperature measurement. More specifically, equation 1 below is an algorithm employed by the BCE 304 to estimate the OCV for the battery cell 204, where "V" is the voltage of the battery cell 204, and "DP" is the decay parameter.

$$V = OCV + DP \qquad \text{Equation 1}$$

In one form, the decay parameter has a non-linear correlation with voltage in that, after deactivation of the EV 100, the rate of change of voltage with time is not constant. The decay parameter of equation 1 characterizes the decaying voltage using an exponential parameter involving a square root of the duration, and further includes a coefficient and a constant that are a function of the voltages and battery temperature.

In one form, the decay parameter is provided as $\beta e^{-\sqrt{kt}}$, and includes sub-parameters such as $\beta$, k, and t. In the decay parameter, "$\beta$" is a coefficient related to SOC, temperature, and the magnitude of the current before contactors open; "k" is a time constant that is related to a diffusion coefficient in the electrodes, and likely follows an Arrhenius relationship (i.e., $k=Ae^{-E_a/RT}$); and "t" is time.

In one form, with the decay parameter being that of equation 2, B at time "t" (i.e., $\beta_t$) may be defined as equation 3A in which V (t) is a voltage measurement at time "t" and "V(0)" is voltage measured at t=0 seconds. Specifically, when t=0, equation 3 turns to V(0)=OCV+B, where OCV=V (0)−$\beta$. Substituting OCV in equation 3 with "V(0)−$\beta$," $\beta$ is then represented by equation 3A. In a non-limiting example, equation 3B provides $\beta$ at a t=60. The sign of "B" is dependent on the direction of the current just before the battery pack 106 is decoupled. That is, if the battery pack 106 was being (predominately) discharged just before deactivation, the sign of $\beta$ is negative indicating the voltage will be lower than the OCV. If the battery pack 106 was being (predominately) charged, $\beta$ is positive.

$$\beta e^{-\sqrt{kt}} \qquad \text{Equation 2}$$

$$\beta_t = \frac{V(t) - V(0)}{e^{-\sqrt{k*t}} - 1} \qquad \text{Equation 3A}$$

$$\beta_{60sec} = \frac{V(t = 60) - V(0)}{e^{-\sqrt{k*60}} - 1} \qquad \text{Equation 3B}$$

In some example systems, the decay parameter, and specifically $\beta$ and k, are estimated using complex regression models using voltage measurements taken for a selected duration, such as one minute. However, such estimation techniques may require computational power that can exceed hardware limitations of the BMM 132.

As detailed herein, k is defined in terms of $\beta$, and $\beta$ is estimated using a selected relaxation time ($t_{RELAX}$) from among a plurality of calibrated relaxation times, and by comparing predicted $\beta$ (i.e., $\beta$pred) across a range of candidate $\beta$ ($\beta$cand). Specifically, at a relaxation time, which is some time after a relaxation process starts and voltage measurement accuracy is less than or equal to a voltage sensor error (VSE), then at the relation time (i.e., $t=t_{RELAX}$), $|V (t_{RELAX})−OCV|\leq V_{SE}$. In one form, the relaxation time is estimated based on a temperature of the battery pack 106, an absolute delta voltage (i.e., absolute change in voltage) estimated using at least a portion of the voltages measured, and relaxation time correlation data that associates selected inputs (e.g., the temperature and the absolute delta voltage) to associated relaxation times. In a non-limiting example, the relaxation correlation data is provided as a one or more look-up tables.

By setting time as the relaxation time in equation 3A, k is expressed as a function of B, $V_{SE}$, and the relaxation time ($t_{RELAX}$), as provided in equation 4.

$$k = \frac{\ln\left[\frac{V_{SE}}{\beta_{cand}}\right]^2}{t_{RELAX}} \qquad \text{Equation 4}$$

Figure 4A:
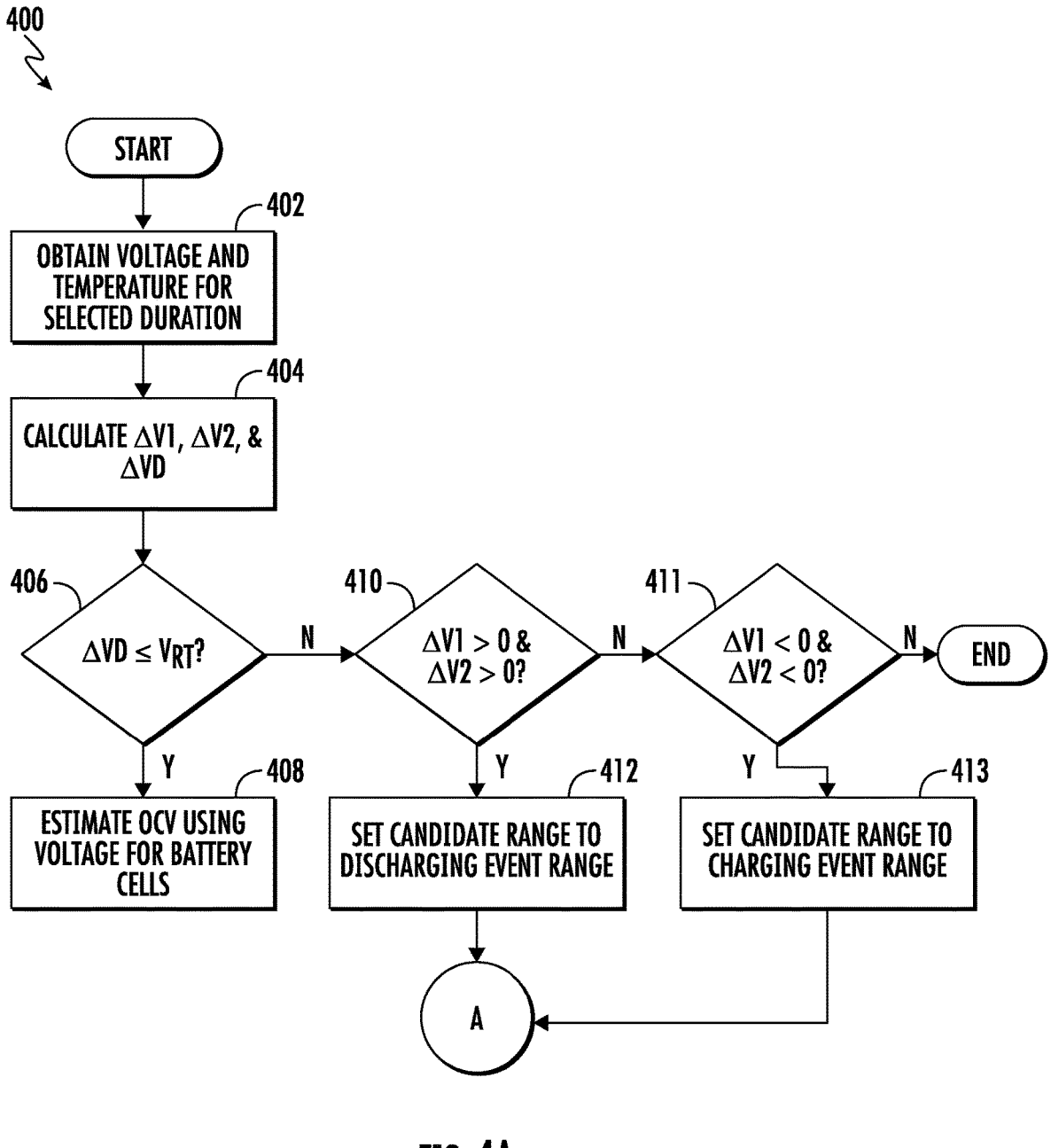
FIGS. 4A and 4B are flowcharts of an open circuit voltage estimation routine in accordance with the present disclosure.
Figure 4B:
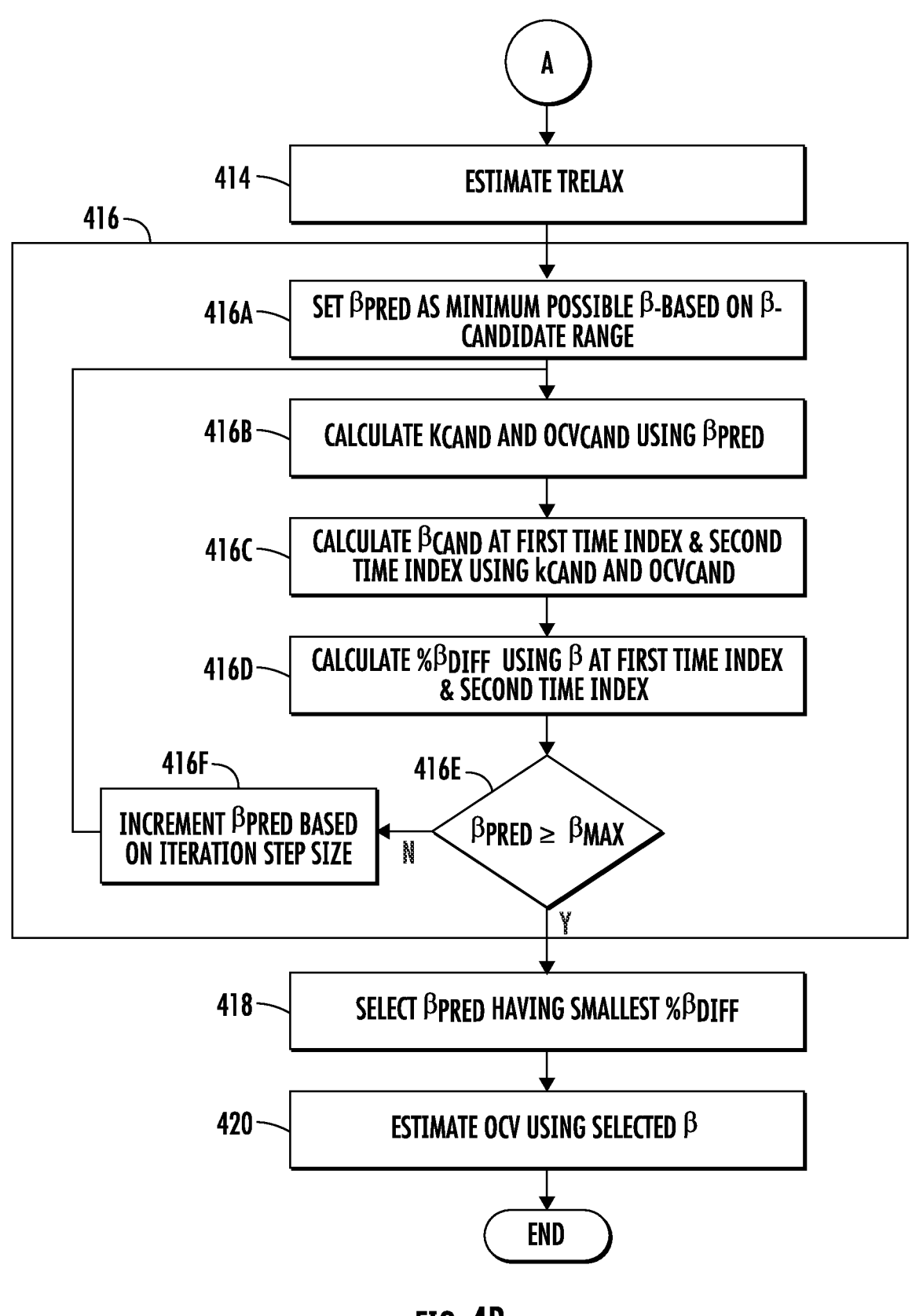

Referring to FIGS. 4A and 4B, an example of an OCV estimation routine 400 is provided and executable by the BMM 132, as part of the OCV estimator 308. As detailed herein, the BMM 132 estimates the OCV based on voltages measured for a duration after a last deactivation of the EV, a decay parameter that is a function of the voltages measured and detected using a selected relaxation time and an iterative estimation of a sub-parameter of the decay parameter, and a temperature measurement. The control system 130 is configured to charge and discharge the battery pack 106 according to power limits defined at activation of the EV by the estimated OCV.

At operation 402, the BMM 132 obtains a plurality of voltage measurements for a set duration and at least one temperature measurement (T) of the battery pack 106 after deactivation. More particularly, when the BMM 132 receives a deactivation request from the control system 130 to electrically disconnect the battery pack 106 from the charge-discharge system of the EV 100, the contactor 210 is opened, and the sensors 134 measure voltage of the battery cells 204 for a selected duration such as, but not limited to 25 sec., 30 sec, 60 secs, or 90 sec. In one form, the duration is less than a stabilization time for active material of each of the battery cells 204 to equally distribute across an electrode of the battery cell 204. In one form, at least one temperature measurement is taken at the end of the selected duration after the contactor 210 is opened.

Next, the BMM 132 determines if the battery pack 106 was significantly charging or discharging prior to deactivation. Specifically, at operation 404, the BMM 132 calculates a plurality of delta voltages to assess if the voltage is substantially decreasing or increasing. In a non-limiting example, the BMM 132 calculates delta voltage values $\Delta V1$, $\Delta V2$, and $\Delta VD$ using $\Delta V1 = V(t_D) - V(t_1)$, $\Delta V2 = V(t_1) - V(0)$, and $\Delta VD = |V(t_D) - V(0)|$ where: $V(t_D)$ is voltage measured at end of the duration; $V(t_1)$ is voltage measured at time=$t_1$, where $t_1$ is a time between zero (0) and the duration (e.g., if duration is 30 second, $t_1$ is time=15 sec); and V(0) voltage measured at time zero (0) when the EV 100 is deactivated.

At operation 406, the BMM 132 is configured to determine if the voltage is at relaxation or stated differently, if the voltage measured is the OCV. More specifically, at operation 406, the BMM 132 determines if the $\Delta VD$ is less than or equal to a voltage delta threshold ($V_{RT}$) (i.e., $|V(t_D) - V(0)| \leq V_{RT}$). If so, the BMM 132 estimates the OCV by, for example, averaging the voltage measured at $t_1$ for the battery cells 204. This may occur in various scenarios, such as, but not limited to, the EV 100 being turned off for 6 hrs, then being turned on for a few minutes, and then being turned off without significant charge or discharge. In such case, the battery pack 106 reached relaxation time and the voltage measured is indicative of OCV. The voltage delta threshold is selected to detect a significant voltage rise or fall using the voltage measured for the duration. In a non-limiting example, the voltage delta threshold is provided as $4*V_{SE}$.

If the voltage is not at relaxation (i.e., $\Delta VD > V_{RT}$), the BMM 132 determines if the EV 100 was charging or discharging prior to deactivation. Specifically, at operation 410, the BMM 132 determines if the delta voltage values are greater than zero (i.e., $\Delta V1 > 0$ and $\Delta V2 > 0$). If the delta voltage values are both greater than zero, the EV 100 was discharging prior to deactivation and if both of the delta voltage values are less than zero, as determined at operation 411, the EV 100 was charging prior to deactivation. Otherwise, the BMM 132 is unable to determine either charging or discharging, and the process ends without determining OCV.

From operation 410 and 411, the BMM 132 sets a candidate range at a defined iteration step size for β based on whether the EV 100 was discharging or charging. Specifically, for the iterative estimation, the BMM 132 employs a first sub-parameter candidate range of values for β, a sub-parameter, in response to detecting that the battery pack 106 was discharging prior to the last deactivation and a second sub-parameter candidate range of values different from the first range of values for β in response to detecting that the battery pack 106 was charging prior to the last deactivation.

As described above, β is a negative value when the EV 100 was discharging and is a positive value when the EV 100 was charging. At operation 412, the BMM 132 sets the β-candidate range to a discharging event range where the B-candidate range is provided as: $V(0) - OCV(100) \leq \beta cand \leq 0$ in which OCV(100) is the OCV when the SOC is at 100%, which may be defined and stored by the BMM 132, and V(0) is the voltage measured at time zero. At operation 413, the BMM 132 sets the β-candidate range to a charging event range where the B-candidate range is provided as: $0 \leq \beta cand \leq V(0) - OCV(0)$ in which OCV(0) is the OCV when the SOC is at 0%. The discharging event range for β may be referred to as a first sub-parameter candidate range of values, and the charging event range for β may be referred to as a second sub-parameter candidate range of values.

At operation 414 and as described above, the BMM 132 is configured to detect or select the relaxation time ($t_{RELAX}$) using the relaxation time correlation data with inputs including temperature (T) and an absolute delta voltage that is estimated using at least a portion of the voltages measured (e.g., $\Delta VD$). In one form, the temperature and voltage measurements used are taken at about the same time, which may be determined using a time stamp associated with the measurements.

At operation 416, the BMM 132 is configured to perform the iterative estimation to estimate β (i.e., sub-parameter) within the candidate range at a defined iteration step size. Specifically, at operation 416A, the BMM 132 is configured to set a value for a predicted β ($\beta_{PRED}$) to the minimum possible value of β, which is defined by the β candidate range defined at operation 412 or 414. For example, for the discharging event range, $\beta_{PRED} = V(0) - OCV(100)$, and for the charging event range, $\beta_{PRED} = 0V$.

At operation 416B, using the $\beta_{PRED}$ and $t_{RELAX}$, the BMM 132 is configured to estimate a k-candidate ($K_{CAND}$) and an OCV-candidate ($OCV_{CAND}$). In a non-limiting example, the k-candidate is calculated using equation 4 and the OCV-candidate is calculated by $OCV = V(0) - \beta_{PRED}$.

At operation 416C, the BMM 132 is configured to estimate B-candidate at a first time index ($\beta_{CAND-TI1}$) and at a second time index ($\beta_{CAND-TI2}$) using k-candidate, the OCV-candidate, and voltage measurements associated with the first time index and the second time index. Specifically, the BMM 132 calculates β at least at two selected points in time (i.e., time indexes). In a non-limiting example, the BMM 132 employs equation 5 below to determine β-candidate at a selected time index (i.e., $\beta_{CAND-TI}$) in which V(t) is the voltage measured at the time index and t is the time index. The time indexes may be predefined and selected based on the duration. For example, if the duration is 60 secs, the first time index is 30 secs and the second time index is 60 secs. Accordingly, $\beta_{CAND-TI1}$ is calculated using data related to t=30 seconds and $\beta_{CAND-TI2}$ is calculated using data related to t=60 seconds.

$$\beta_{CAND-TI} = \frac{V(t) - OCV_{CAND}}{e^{-\sqrt{k_{CAND}*t}}} \qquad \text{Equation 5}$$

At operation 416D, the BMM 132 is configured to estimate an error or, stated differently, a difference between $\beta_{CAND-TI1}$ and $\beta_{CAND-TI2}$. Generally, B should be constant and thus, the smaller the difference between $\beta_{CAND\text{-}TI1}$ and $\beta_{CAND\text{-}TI2}$, the more accurate $\beta CAND$ is to a true $\beta$ at OCV. In a non-limiting example, the BMM 132 calculates a percent error or difference (i.e., % $\beta DIFF$) using equation 6.

$$\% \; \beta = \left| \left( \frac{(\beta_{CAND\text{-}TI1} - \beta_{CAND\text{-}TI2})}{\beta_{CAND\text{-}TI1}} \right) \right| \qquad \text{Equation 6}$$

At operation 416E, the BMM 132 is configured to determine if the predicted $\beta$ is greater than or equal to a maximum possible value of $\beta$ (i.e., $\beta_{MAX}$), which is defined by the $\beta$ candidate range defined at operation 412 or 413. For example, for the discharging event range, maximum possible value of $\beta$ is zero and for the charging event range, the maximum possible value of $\beta$ is V(0)–OCV(0)), where OCV(0)=OCV at SOC=0%.

If the predicted B is not greater than or equal to the maximum possible value of B, the BMM 132 is configured to increment $\beta_{PRED}$ based on the iteration step size, at operation 416F. That is, the BMM 132 iteratively increments the value of the predicted $\beta$ based on a selected step size to estimate $\beta$-candidates at the time indexes across the $\beta$-candidate range. In a non-limiting example, the steps size is set to 0.001 or 0.01V. A small iteration step size provides a more refined evaluation of $\beta$, but also increases the computational load than compared to a larger iteration step size.

If the predicted B is greater than to the maximum possible value of $\beta$, the BMM 132 is configured to select the value of B as the value of the $\beta CAND$ having smallest % $\beta_{DIFF}$, at operation 418. For example, the BMM 132 uses the value of the $\beta_{CAND\text{-}TI1}$ having the lowest % $\beta_{DIFF}$ as the value of $\beta$. In one form, of all $\beta$ search values, there is one value that gives the closest estimation of OCV and is between $\beta_{CAND\text{-}TI1}$ and $\beta_{CAND\text{-}TI2}$. Accordingly, the BCE 304 may be configured to determine the $\beta$ value between $\beta_{CAND\text{-}TI1}$ and $\beta_{CAND\text{-}TI2}$ using various techniques, such as but not limited to interpolation. Using, the selected B, which may be referred to as predicted first sub-parameter, the BMM 132 estimates the OCV using OCV=V(0)–$\beta$, at operation 420. With the OCV, the BMM 132 is configured to estimate an initial state of charge of the battery pack based on the estimated OCV, where the power limits are defined, in part, by the initial state of charge.

The OCV estimation routine 400 may be configured to perform other operations within the scope of the present disclosure, and should not be limited to the example described herein. In a non-limiting example, the following provides some variations that may be performed individually or in combination with one another.

In one form, in lieu of calculating % $\beta_{DIFF}$ at 616D, the BCE 304 is configured to calculate % $\beta_{DIFF}$ after all search steps are complete (i.e., after 616E).

In one form, $\beta$ may be estimated using multiple iteration step size in which the iteration step size is changed from a large value to a small value to provide a more refine estimation. Stated differently the iteration step size may be set to a first value for a first set of estimations until a refinement condition establishing a finer analysis of $\beta$ is met. After meeting the refinement condition, the iteration step size is set to a second value less than the first value. In a non-limiting example, the refinement condition detects whether the % $\beta_{DIFF}$ is less than or equal to a refinement threshold (e.g., 90%). Accordingly, if the $\beta_{CAND\text{-}TI1}$ and $\beta_{CAND\text{-}TI2}$ are almost the same (e.g., 90%) then the iteration step size is decreased to the second value. With the multiple iteration step size, the computational demand of the BMM 132 may be reduced. For example, in lieu of the iteration estimation being performed at a step size of 0.001 the iteration estimation is first performed at a step size of 0.01 and is refined to 0.001.

In one form, the BMM 132 is configured to estimate multiple $\beta$ for a plurality of relaxation times. Specifically, measurement errors associated with sensors employed for measuring temperature and voltage can affect the accuracy of the estimated relaxation time. In lieu of estimating one relaxation time, a set of relaxation times are estimated, and for each relaxation time, $\beta$ is estimated.

Specifically, the set of relaxation times is defined using a base relaxation time that is estimated as described above, and with the base relaxation time, a set of relaxation times are defined to include relaxation times provided before and after the base relaxation time. In one form, if a set of relaxation times includes 5 relaxation times with the base relaxation time being one, the other relaxation values are estimated by multiplying the base relaxation time ($t_{relax}$) by a set of relaxation coefficients. The relaxation coefficients include [a1, a2, a3, a4, a5], where a3=1 for the base relaxation time. The set of relaxation times is represented as $t_{RELAX\text{-}1}$, $t_{RELAX\text{-}2}$, $t_{RELAX\text{-}3}$, $t_{RELAX\text{-}4}$, and $t_{RELAX\text{-}5}$, where: $t_{RELAX\text{-}1}$=a1*$t_{relax}$; $t_{RELAX\text{-}2}$=a2*$t_{relax}$; $t_{RELAX\text{-}3}$=a3*$t_{relax}$; $t_{RELAX\text{-}4}$=a4*$t_{relax}$, and $t_{RELAX\text{-}5}$=a5*$t_{relax}$. In a non-limiting example, the relaxation coefficients are defined as: [a1, a2, a3, a4, a5]=[0.6, 0.8, 1, 1.2, 1.5]. The sub-parameter B is estimated for each relaxation time, and then the Bs are averaged to define a final estimated B for OCV. While the set of relaxation times is provided as including five relaxation times, the set of relaxation times may include two or more relaxation times. In addition, the relaxation coefficients may be defined to other suitable values and should not be limited to the example provided herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

In this application, the term "module" and/or "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory or memory device is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

As used herein, the phrase at least one of A, B, and C should be construed to mean a logical (A OR B OR C), using a non-exclusive logical OR, and should not be construed to mean "at least one of A, at least one of β, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system for an electrified vehicle (EV) having a battery pack, comprising:
one or more sensors configured to measure at least one of a voltage and a temperature of the battery pack; and
a vehicle controller configured to charge and discharge the battery pack according to power limits defined at activation of the EV by an open circuit voltage (OCV) that is based on voltages measured for a duration after a last deactivation of the EV, at least one temperature measured after the last deactivation, and a decay parameter that is a function of the voltages measured and detected using a selected relaxation time and an estimated sub-parameter of the decay parameter.

2. The system of claim 1, wherein the estimated sub-parameter uses a first sub-parameter candidate range of values for the sub-parameter in response to detecting that the battery pack was discharging prior to the last deactivation and a second sub-parameter candidate range of values different from the first range of values for the sub-parameter in response to detecting that the battery pack was charging prior to the last deactivation.

3. The system of claim 1, wherein the vehicle controller is further configured to detect the selected relaxation time based on a temperature and a delta voltage using at least a portion of the voltages measured.

4. The system of claim 1, wherein the estimated sub-parameter falls within a candidate range at a defined iteration step size.

5. The system of claim 4, wherein the defined iteration step size is set to a first value for a first set of estimations and a second value less than the first value for a second set of estimations.

6. The system of claim 1, wherein the decay parameter has a non-linear correlation with the voltages measured.

7. The system of claim 1, wherein the vehicle controller is further configured to:
detect a plurality of selected relaxation times based on a temperature and a delta voltage using at least a portion of the voltages measured,
for each selected relaxation time, estimate the sub-parameter, and

estimate the decay parameter based on the sub-parameters estimated for the plurality of selected relaxation time.

8. The system of claim 1, wherein the duration is less than a stabilization time for active material of each battery cell of the battery pack to equally distribute across an electrode of the battery cell.

9. The system of claim 1, wherein the vehicle controller is further configured to estimate an initial state of charge of the battery pack based on the OCV, wherein the power limits are defined, in part, by the initial state of charge.

10. The system of claim 1, wherein the sub-parameter includes a first sub-parameter and a second sub-parameter that is defined in terms of the first sub-parameter.

11. The system of claim 10, wherein, the vehicle controller is further configured to:
define a first sub-parameter candidate range,
iteratively select a first sub-parameter candidate based on an iteration step size and the first sub-parameter candidate range, and
for each first sub-parameter candidate,
estimate the second sub-parameter using the first sub-parameter candidate and the selected relaxation time,
estimate an OCV candidate using the first sub-parameter candidate, and
calculate a first sub-parameter error using first sub-parameter values estimated using the second sub-parameter and the OCV candidate for a first time index and a second time, and
estimate the OCV using a predicted first sub-parameter associated with the first sub-parameter error that is lower than other first sub-parameter errors calculated.

12. A method of controlling an electrified vehicle (EV) having a battery pack including a plurality of battery cells, comprising:
responsive to a deactivation request, opening one or more contactors to electrically decouple the battery pack from a charge-discharge system of the EV;
responsive to an activation,
closing the one or more contactors to electrically couple the battery pack to the charge-discharge system, and
charging or discharging the battery pack according to power limits defined at activation of the EV by an open circuit voltage (OCV) that is based on voltages measured for a duration after a last deactivation of the EV, at least one temperature measured after the last deactivation, and a decay parameter that is a function of the voltages measured and detected using a selected relaxation time and an estimated sub-parameter of the decay parameter.

13. The method of claim 12, further comprising:
detecting whether the battery pack was discharging or charging prior to the last deactivation;
using a first sub-parameter candidate range of values for the sub-parameter in response to detecting that the battery pack was discharging prior to the last deactivation; and
using a second sub-parameter candidate range of values different from the first range of values for the sub-parameter in response to detecting that the battery pack was charging prior to the last deactivation.

14. The method of claim 12, further comprising detecting the selected relaxation time based on a temperature and a delta voltage using at least a portion of the voltages measured.

15. The method of claim 12, wherein the estimated sub-parameter falls within a candidate range at a defined iteration step size.

16. The method of claim 15, wherein, the defined iteration step size is set to a first value for a first set of estimations and a second value less than the first value for a second set of estimations.

17. The method of claim 12, further comprising:

detecting a plurality of selected relaxation times based on a temperature and a delta voltage using at least a portion of the voltages measured;

for each selected relaxation time, estimating the sub-parameter; and estimating the decay parameter based on the sub-parameters estimated for the plurality of selected relaxation time.

18. The method of claim 12, wherein the duration is less than a stabilization time for active material of each of the battery cells to equally distribute across an electrode of the battery cell.

19. The method of claim 12, further comprising estimating an initial state of charge of the battery pack based on the OCV, wherein the power limits are defined, in part, by the initial state of charge.

20. The method of claim 12, further comprising:

defining a first sub-parameter candidate range;

iteratively selecting a first sub-parameter candidate based on an iteration step size and the first sub-parameter candidate range; and for each first sub-parameter candidate, estimating a second sub-parameter using the first sub-parameter candidate and the selected relaxation time;

estimating an OCV candidate using the first sub-parameter candidate; and calculating a first sub-parameter error using first sub-parameter values estimated using the second sub-parameter and the OCV candidate for a first time index and a second time; and estimating the OCV using a predicted first sub-parameter associated with the first sub-parameter error that is lower than other first sub-parameter errors calculated.

* * * * *